United States Patent
Levy et al.

(10) Patent No.: US 8,615,738 B2
(45) Date of Patent: Dec. 24, 2013

(54) SYSTEM AND METHOD FOR SOFTWARE PRODUCT TEST MODULARIZATION

(75) Inventors: Robert Bruce Levy, Watertown, MA (US); Frank Joseph McGrath, Wellesley, MA (US); Mark Frederick Victory, Westford, MA (US); Steven Wesley Walton, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 2278 days.

(21) Appl. No.: 11/026,145

(22) Filed: Dec. 30, 2004

(65) Prior Publication Data

US 2006/0048100 A1 Mar. 2, 2006

Related U.S. Application Data

(60) Provisional application No. 60/588,865, filed on Jul. 16, 2004.

(51) Int. Cl.
*G06F 9/44* (2006.01)

(52) U.S. Cl.
USPC ............ 717/124; 717/100; 717/115; 717/126

(58) Field of Classification Search
None
See application file for complete search history.

(56) References Cited

U.S. PATENT DOCUMENTS

| | | | | |
|---|---|---|---|---|
| 6,061,517 | A * | 5/2000 | House et al. | 717/115 |
| 6,202,200 | B1 * | 3/2001 | House et al. | 717/100 |
| 6,401,220 | B1 * | 6/2002 | Grey et al. | 714/33 |
| 6,698,012 | B1 * | 2/2004 | Kossatchev et al. | 717/126 |
| 6,701,514 | B1 * | 3/2004 | Haswell et al. | 717/115 |
| 7,039,912 | B1 * | 5/2006 | Moulden et al. | 718/100 |
| 7,174,541 | B2 * | 2/2007 | Muller et al. | 717/124 |
| 7,343,586 | B1 * | 3/2008 | Hernandez, III | 717/124 |
| 7,373,636 | B2 * | 5/2008 | Barry et al. | 717/124 |
| 7,840,944 | B2 * | 11/2010 | Brunswig et al. | 717/124 |
| 8,024,706 | B1 * | 9/2011 | Krauss | 717/124 |
| 2004/0015846 | A1 * | 1/2004 | Haisraeli | 717/115 |
| 2004/0194054 | A1 * | 9/2004 | McGrath et al. | 717/100 |
| 2005/0268285 | A1 * | 12/2005 | Bagley et al. | 717/124 |

OTHER PUBLICATIONS

Marceau et al., A Dataflow Language for Scriptable Debugging, Sep. 2004, 10 pages.*

* cited by examiner

*Primary Examiner* — Thuy Dao
(74) *Attorney, Agent, or Firm* — Hamilton, Brook, Smith & Reynolds, P.C.

(57) ABSTRACT

In accordance with one embodiment of the invention, there is provided a method for modularizing testing of a software product. The method comprises receiving user input indicating a source and a destination of test content; and linking modification of the test content at the destination to modification of the test content at the source. In further related embodiments, receiving the user input may comprise receiving input of a copy/paste gesture for the test content, or a drag/drop gesture for the test content. The linking may comprise using a globally unique identifier to identify each test step of a test document; and using the globally unique identifier as a pointer from the destination to the source of the test content. The method may also comprise rendering the test content to the user as if the test content was in-line at the destination.

22 Claims, 8 Drawing Sheets

SYSTEM AND METHOD FOR SOFTWARE PRODUCT TEST MODULARIZATION

RELATED APPLICATION

This application claims the benefit of U.S. Provisional Application No. 60/588,865, entitled "Test Modularization via Link using Standard User Gestures," filed on Jul. 16, 2004. The entire teachings of the above application are incorporated herein by reference.

BACKGROUND OF THE INVENTION

When the user interface of a piece of software undergoes significant change, all automated and manual tests must be maintained.

Some automated test tools, such as IBM Rational Robot, support the notion of subroutines; and others, such as IBM Rational Functional Tester, support Object Oriented concepts. However, the majority of software testers in the Enterprise IT marketplace are non-programmers who author their test content in-line, with significant duplication of steps.

SUMMARY OF THE INVENTION

In accordance with one embodiment of the invention, there is provided a method for modularizing testing of a software product. The method comprises receiving user input indicating a source and a destination of test content; and linking modification of the test content at the destination to modification of the test content at the source.

In further related embodiments, receiving the user input may comprise receiving input of a copy/paste gesture for the test content, or a drag/drop gesture for the test content. The linking may comprise using a globally unique identifier to identify each test step of a test document; and using the globally unique identifier as a pointer from the destination to the source of the test content. The method may also comprise rendering the test content to the user as if the test content was in-line at the destination. The test content may be selected from one or more of a current test document, an alternate test document, a project of tests, and a list of favorites. The method may also comprise causing a user interface to be displayed, the user interface comprising an outline sub-window, an editor sub-window, and a favorites sub-window; wherein at least the outline sub-window and the editor sub-window display a representation of the test content. A user interface may display an outline sub-window allowing alternate expanded and contracted representations of the test content; and may display a favorites sub-window allowing user-selected test content to persist in a linkable fashion between openings of different test documents. The user interface may also display a properties sub-window allowing user prescription of fields for input during execution of the test content. An outline sub-window for the test content may also allow user creation of one or more of: test steps, verification points, test cases, or folders.

In another embodiment according to the invention, there is provided a system for modularizing testing of a software product. The system comprises user interface means for receiving user input indicating a source and a destination of test content; and link means for linking modification of the test content at the destination to modification of the test content at the source.

In further related embodiments, the interface means may comprise means for receiving input of a copy/paste gesture for the test content, or means for receiving input of a drag/drop gesture for the test content. The link means may comprise a globally unique identifier used as a pointer from the destination to the source of the test content. The interface means may comprise means for rendering the test content to the user as if the test content was in-line at the destination; and may also comprise an outline sub-window, an editor sub-window, and a favorites sub-window; wherein at least the outline sub-window and the editor sub-window display a representation of the test content. An outline sub-window may allow alternate expanded and contracted representations of the test content. A favorites sub-window may allow user-selected test content to persist in a linkable fashion between openings of different test documents. A properties sub-window may allow user prescription of fields for input during execution of the test content. The outline sub-window for the test content may also allow user creation of one or more of: test steps, verification points, test cases, or folders.

In another embodiment according to the invention, there is provided a computer-readable medium carrying one or more sequences of instructions for modularizing testing of a software product, wherein execution of the one or more sequences of instructions by one or more processors causes the one or more processors to perform the steps of receiving user input indicating a source and a destination of test content; and linking modification of the test content at the destination to modification of the test content at the source.

In a further embodiment according to the invention, there is provided a computer program propagated signal product embodied on a propagated signal on a propagation medium, such propagated signal carrying one or more sequences of instructions for modularizing testing of a software product, wherein execution of the one or more sequences of instructions by one or more processors causes the one or more processors to perform the steps of receiving user input indicating a source and a destination of test content; and linking modification of the test content at the destination to modification of the test content at the source.

In another embodiment according to the invention, there is provided a software test apparatus comprising a user interface enabling (i) user selection of test content and (ii) user indication of a source and destination of the selected test content; and a reference link between the destination and source of the selected test content, the user interface enabling re-use of test content by user selection of the test content for plural destinations, for each destination there being a respective reference link, such that testing of a software design is modularized.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
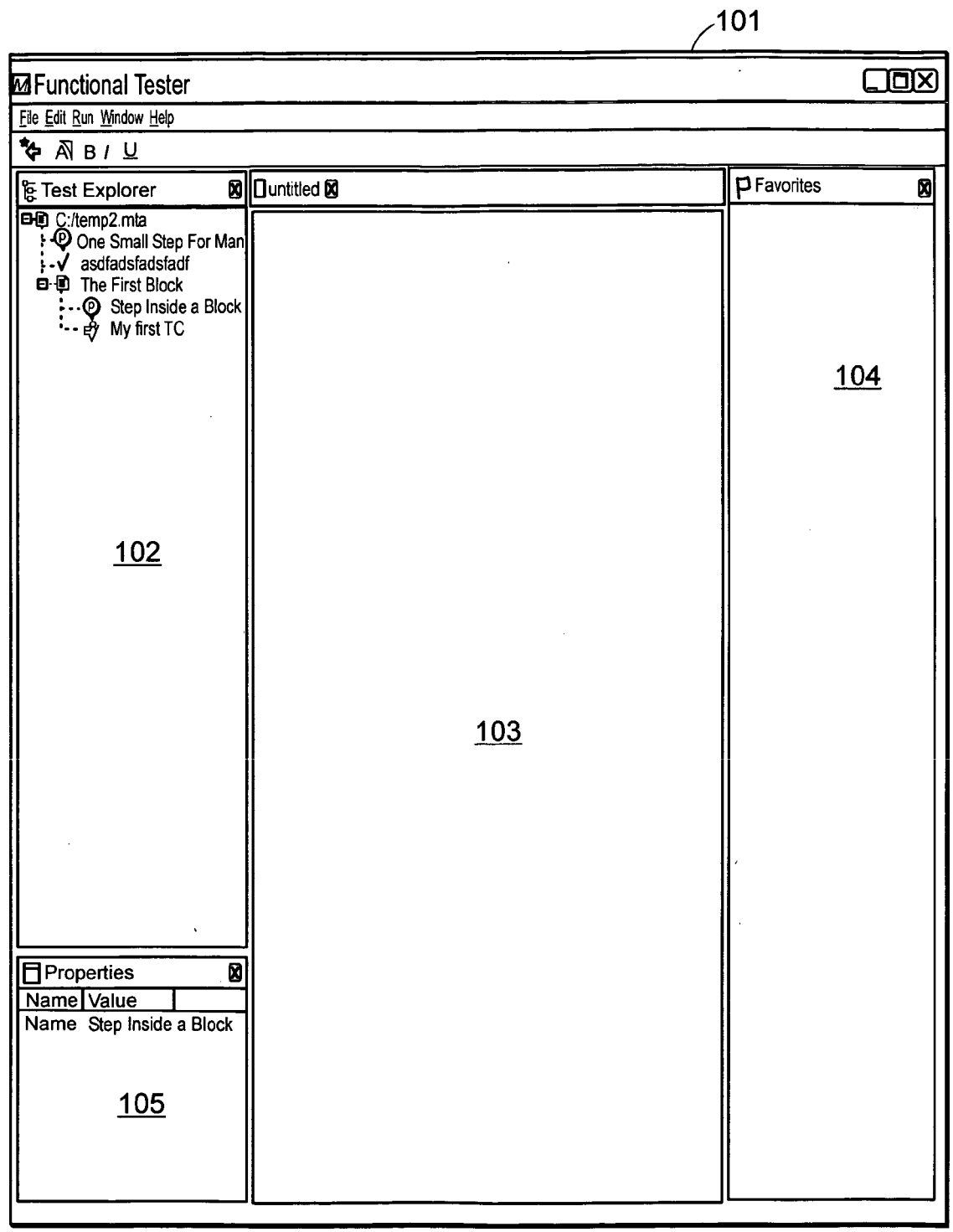
FIG. 1 shows a user interface that may be used to implement an embodiment according to the invention.

Because the majority of software testers author their test content in-line, with significant duplication of steps, changes to a user interface require the tester to hand-edit an unacceptable number of test scripts to adapt the many duplicate steps. This maintenance burden undermines a software customer's return on investment, and reduces manual and automated test productivity.

An embodiment according to the invention is based on the insight that a software tester may use similar techniques to those used by software programmers in methods and subroutines, to reduce the need to duplicate changes to test steps when a software design changes. In particular, an embodiment according to the invention allows a tester to use familiar user interface gestures, such as copy/paste and drag/drop, to create links between steps that are duplicated in multiple places in a software test. This "paste as link" and "drop as link" mode of operation implicitly replicates the modular nature of a programmatic module; thereby potentially allowing a tester to reduce by orders of magnitude the expense of re-testing when a software design is changed. A tester may use such a technique to discover the benefits of modularity, beginning at the onset of their test authoring; and may also use such a technique to expedite re-factoring of existing test content.

In one embodiment according to the invention, a user may select a test step, or multi-select a group of test steps, from any one of a number of different possible sources of test content, including a current test document, an alternate test document, a project of tests, a list of favorites, or another source of test content. The user then gestures to indicate the intention to re-use the selected test content, by a gesture that indicates both the source and destination of the test content. For example, the gesture may be the familiar copy/paste or drag/drop gesture. The system then creates a reference link, at the destination, to the source of the test content. Conceptually, such a link makes use of the computer science notion of a pointer; and may, for instance, be a link that is much like a Web hyperlink, although other link structures are suitable. At the conclusion of this process, the system may render the referenced content to the user as if the referenced content was in-line at its destination, for example by copying the referenced test content into the represented text of the test. Alternatively, the system may represent the existence of a link to the source of test content, without rendering the referenced content at the source location.

By such a process, an embodiment according to the invention provides the tester with the ability to isolate the impact on test scripts of a change to a software design. For example, consider the testing of an e-business Web application requiring the end user to logon. The process for logging-on to this application would previously have been prescribed in duplicate across potentially tens of thousands of tests that a software team performs at each release to validate that the application is of marketable quality. Should the software design of the logon procedure change, then all tests related to the logon procedure would have to be changed manually, in potentially tens of thousands of different instances. Instead, in accordance with an embodiment of the invention, the test needs only to be changed at one location, and then all tests that have been linked to the test content at that location using user gestures will also be changed, automatically.

In accordance with an embodiment of the invention, each step of a test entered by a user, as delineated by carriage returns, is denoted by a Globally Unique Identifier (GUID). Linked steps then serve as a pointer, using the GUID of the source steps. Such a technique may be used for test content within one document containing test content, or across different test content documents. Other equivalent implementations may be used, as will be appreciated by those of skill in the art.

FIG. 1 shows a user interface 101 that may be used to implement an embodiment according to the invention. An outline sub-window 102 provides a summary of each step of the test content contained in an editor sub-window 103, which acts as a user editor for a document containing the test steps. Whereas all steps are listed in the editor sub-window 103, the outline sub-window 102 uses plus and minus symbols to allow test sub-routines to be expanded, to show all steps within the sub-routine; or contracted, to show only the summary name of the sub-routine. A favorites sub-window 104 acts as a holding bin, for each machine on which an embodiment according to the invention is used, of content that the user elects as frequently re-used test content. Such a technique has strong "link" and "browser" analogies, which assists in user familiarity with the system. Test content may be copied/pasted or dragged/dropped, as a link, in order to facilitate re-use. One or more steps may be selected and linked from the outline sub-window 102 to the editor sub-window 103 or vice versa; from the outline sub-window 102 to the favorite sub-window 104 or vice versa; or from the editor sub-window 103 to the favorite sub-window 104 or vice versa. A properties sub-window 105 allows a user to manage the custom properties and values for a currently selected test step in the editor sub-window 103.

As an example of the use of the user interface of the embodiment of FIG. 1, a tester may recall previously authoring test content that serves the need of the current test step; for example, a test step relating to the sequence to logon to the application, or navigate to buy an auction item. The tester then copies and pastes (or drags and drops) the test step (or multi-selected group of steps) from a past test document or list of favorites at 104 to editor sub-window 103 or outline sub-window 102. A system according to an embodiment of the invention then links to the same test content module as is in the past test document (the source), such that changes made in one test are made visible in all tests that link to this step. The tester sees the content in-line as linked from the source of the content, for example with a grey background and icon to indicate that it is a link. If a software developer then changes the flow relating to the test step, for example by radically changing the flow of a login procedure, the tester need only change the test script in one place. The test changes are then propagated throughout the potentially thousands of linked scripts, as needed.

Figure 2:
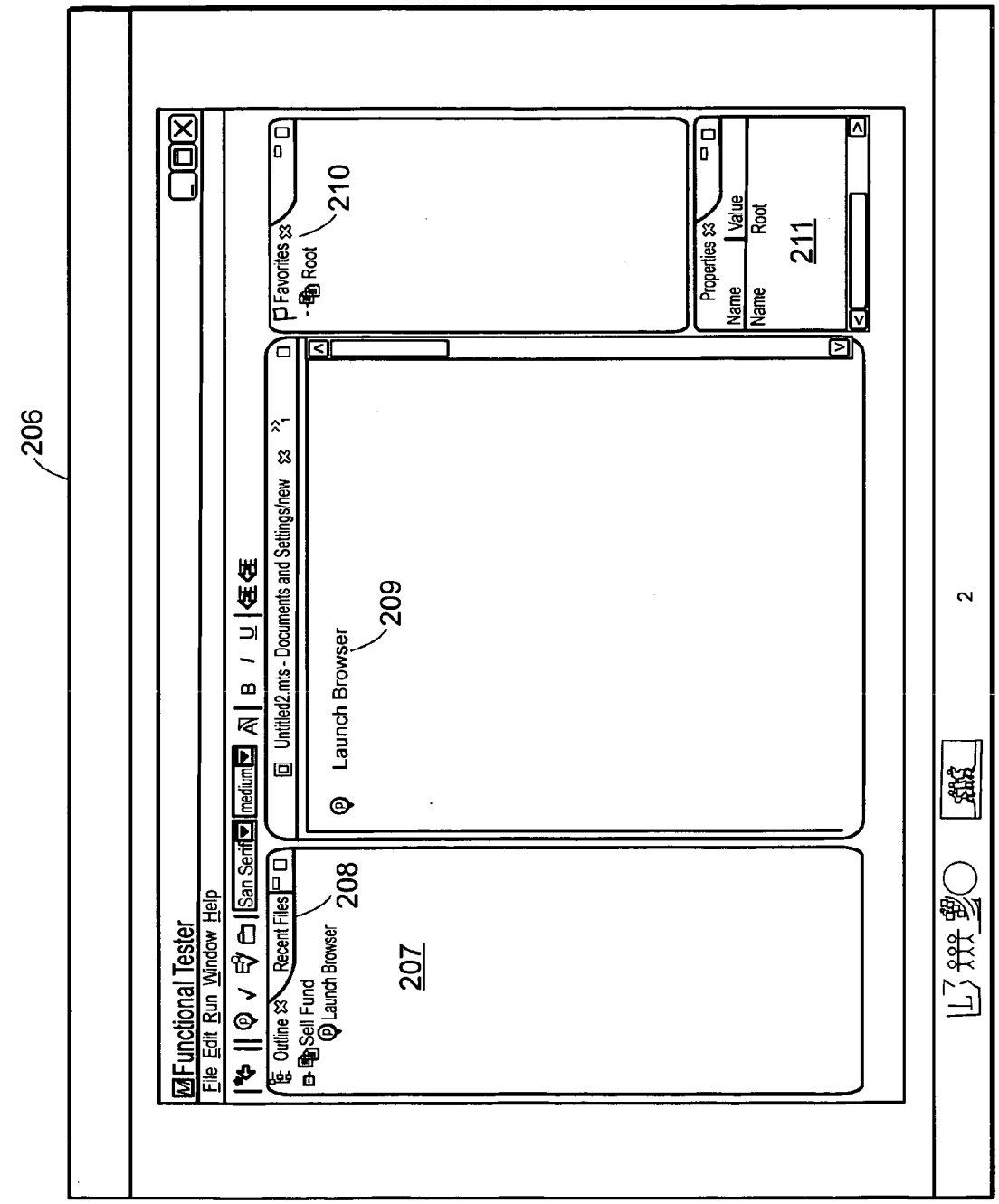
FIG. 2 shows another user interface that may be used to implement an embodiment according to the invention.

FIG. 2 shows another user interface 206, that may be used to implement an embodiment according to the invention. An outline sub-window 207 provides a visually succinct view, to show a maximum number of candidates of test content for re-use, in the smallest possible screen display area. A tool may create a default outline name for each step or sub-routine, for instance by giving the first 32 characters of each step, but may allow the tester to specify a more meaningful name for the step or sub-routine. A recent files list 208 provides access to recently accessed files. An editor sub-window 209 may be implemented, for example, as a rich text editor; or using another type of editor window, as will be appreciated by those of skill in the art. A tester may enter a textual description of steps to be performed during manual execution. In a favorites sub-window 210, the tester can keep track of favorite re-use modules, to drag/drop or copy/paste into other tests and test documents. In a properties sub-window 211, a test team can, for example, prescribe custom fields that are important to their test process, which may be prompted to a user for entry during execution of each test step.

Figure 3:
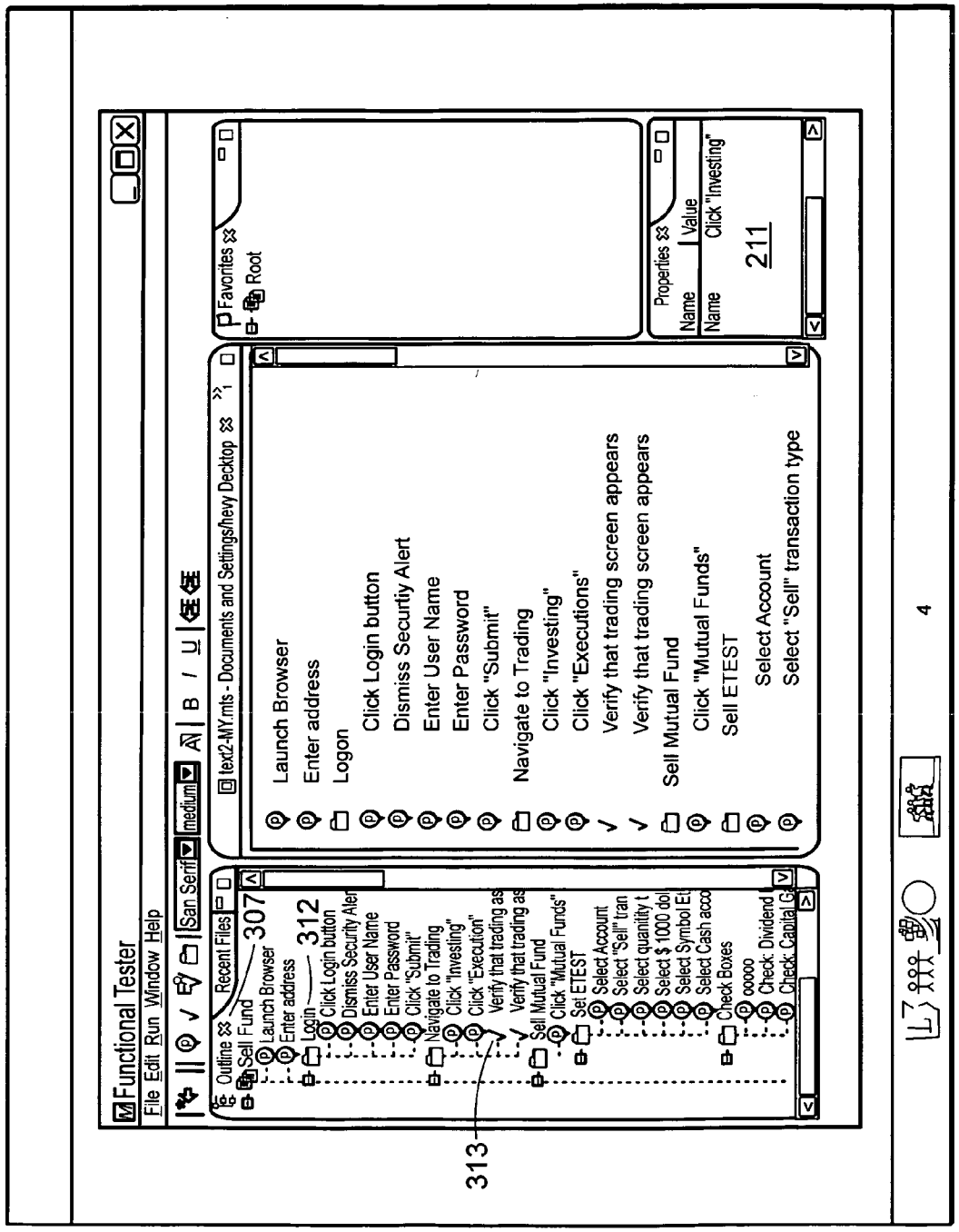
FIG. 3 shows use of the outline sub-window of the user interface of FIG. 2, in accordance with an embodiment of the invention.

FIG. 3 shows use of the outline sub-window of the user interface of FIG. 2, in accordance with an embodiment of the invention. In the outline sub-window 307 of FIG. 3, a tester is enabled to structure test content into meaningful folders 312, such as a logon folder. The tester can also create 313 test steps, verification points, test cases, or folders, in the outline sub-window.

Figure 4:
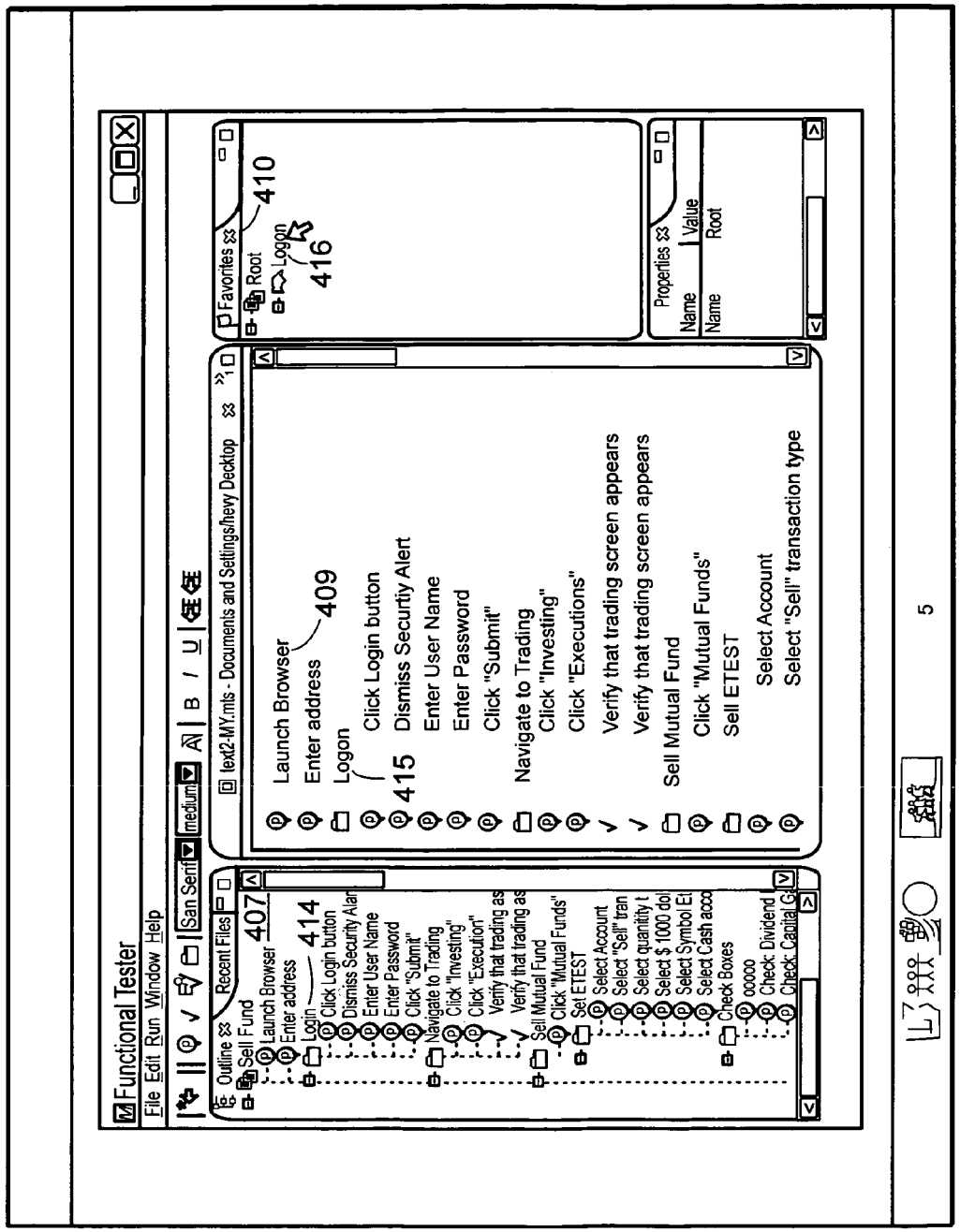
FIG. 4 shows use of the favorites sub-window of the user interface of FIG. 2, in accordance with an embodiment of the invention.

FIG. 4 shows use of the favorites sub-window of the user interface of FIG. 2, in accordance with an embodiment of the invention. A tester selects content 414, 415 to copy/paste or drag/drop from the outline sub-window 407 or editor sub-window 409, and then pastes or drops the content 416 into the favorites sub-window 410. The content 416 in the favorites sub-window 410 may then be subsequently copy/pasted or dragged/dropped into the editor 409 or outline 407 sub-windows. If the tester creates a new document, the favorites re-usable content 416 persists, so that it can be used when desired. Test content that is listed in a summarized form on the favorites sub-window 410 may be expanded into multiple steps when pasted into an editor sub-window 409.

Figure 5:
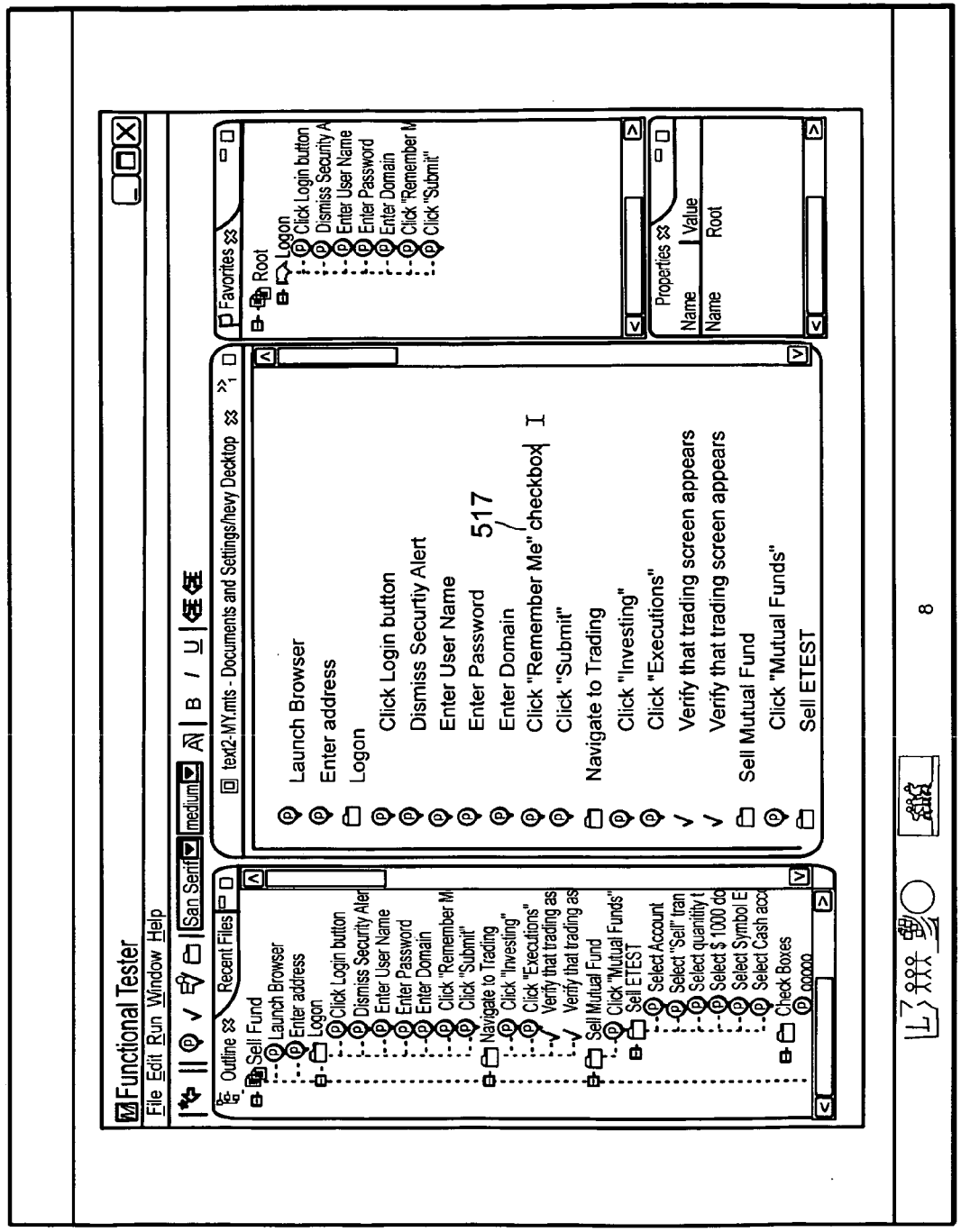
FIGS. 5 and 6 show addition of a step to test content in a logon procedure, in a user interface according to an embodiment of the invention.
Figure 6:
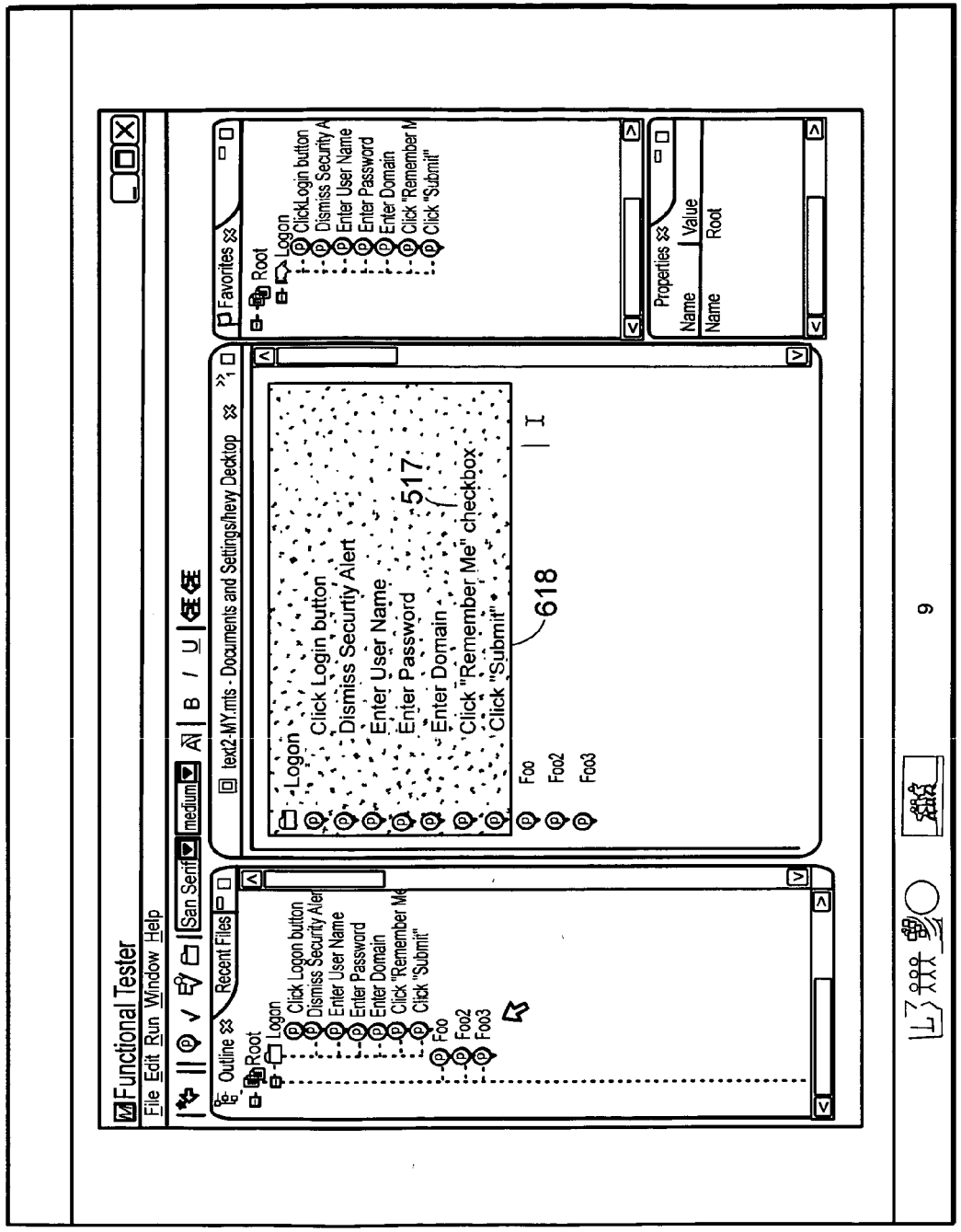

FIGS. 5 and 6 show addition of a step 517 to test content in a logon procedure, in a user interface according to an embodiment of the invention. As shown in FIG. 6, any other tests 618 that consume the linked content of the logon procedure test, are modified to include the new step 517.

Figure 7:
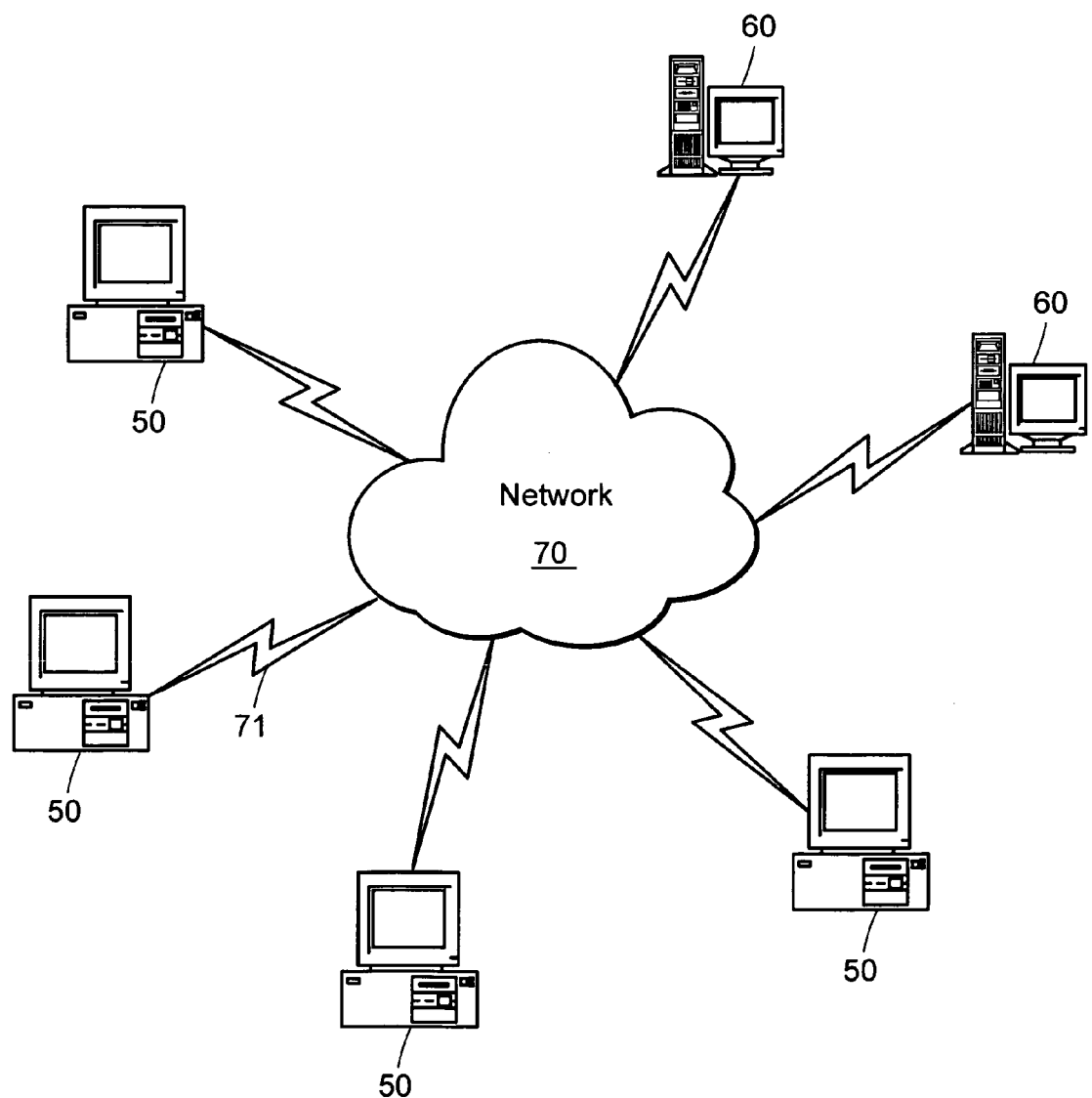
FIG. 7 illustrates a computer network or similar digital processing environment in which an embodiment according to the invention may be implemented.

FIG. 7 illustrates a computer network or similar digital processing environment in which an embodiment according to the invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8:
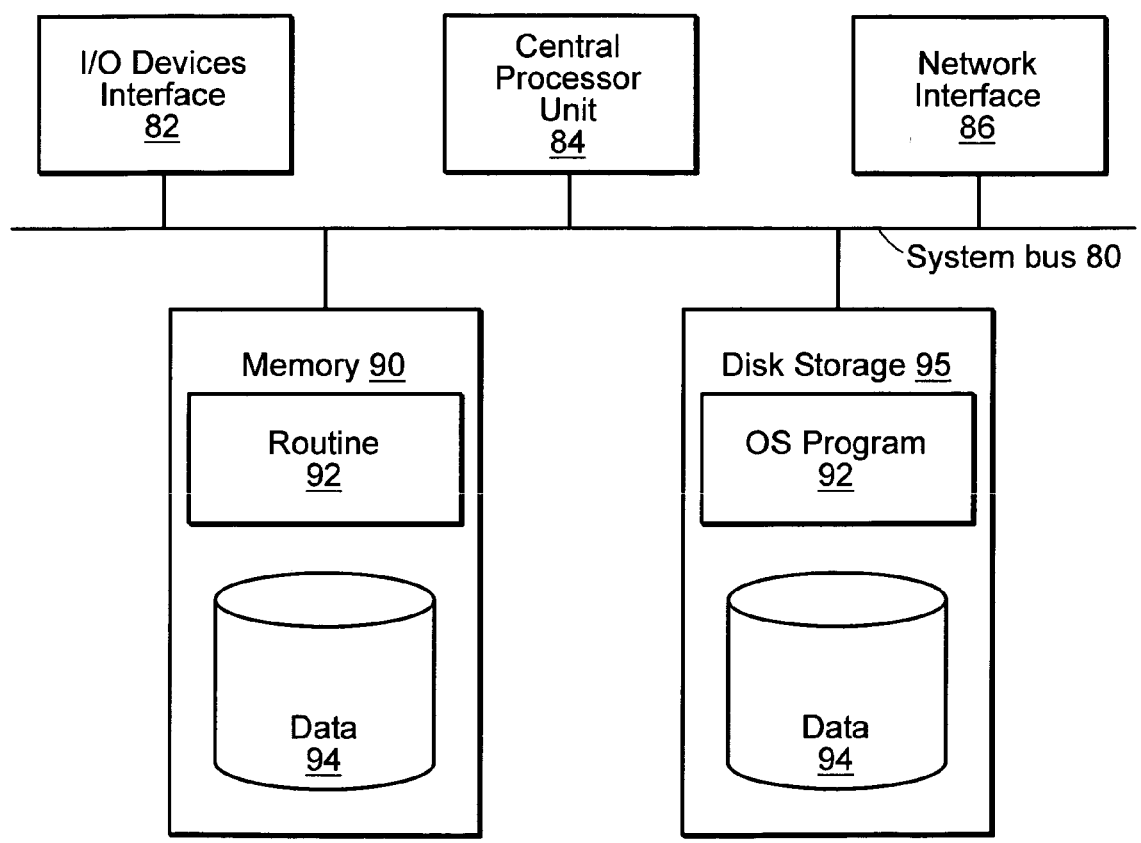
FIG. 8 is a diagram of the internal structure of a computer in the computer system of FIG. 7, upon which an embodiment according to the invention may be implemented.

FIG. 8 is a diagram of the internal structure of a computer (e.g., client processor/device 50 or server computers 60) in the computer system of FIG. 7, upon which an embodiment according to the invention may be implemented. Each computer 50, 60 contains system bus 80, where a bus is a set of hardware lines used for data transfer among the components of a computer or processing system. Bus 80 is essentially a shared conduit that connects different elements of a computer system (e.g., processor, disk storage, memory, input/output ports, network ports, etc.) that enables the transfer of information between the elements. Attached to system bus 80 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions used to implement an embodiment of the present invention (e.g., Program Routines 92 and Data 94, detailed later). Disk storage 95 provides non-volatile storage for computer software instructions 92 and data 94 used to implement an embodiment of the present invention. Central processor unit 84 is also attached to system bus 80 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 71 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals/medium, storage medium and the like.

Various computer program products may be used to enable use of the windows and sub-windows of FIGS. 1-6, in accordance with an embodiment of the invention. For example, standard software techniques for creating and using windows, hierarchies, and similar technologies may be used.

It will also be appreciated by those of ordinary skill in the art that a wide variety of different techniques may be used to implement an embodiment according to the invention. For example, different user interfaces may be used; in fact, the concept of test modularity via links may be used without reference to a windowed display such as that of FIGS. 1-6. Other modifications may also be made, while remaining within the scope of the invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of using a computer device for modularizing testing of a software product, the method comprising:
   using the computer device to receive user selection of test script content, the test script content being at a source among a plurality of sources;
   using the computer device to receive, as user input, a user interface gesture indicating the source and a destination of the selected test script content; and
   using the computer device, in response to the received user interface gesture, to create a reference link at the destination linking to the selected test script content at the source, the reference link effectively linking modification of the test script content at the destination to modification of the test script content at the source such that subsequent modification of the test script content at the source is automatically made at the destination and at each destination linked to the source by a respective user interface gesture created link, without additional user input being performed;
   permitting re-use of the test script content by user selection of the test script content for at least one subsequent destination, for each subsequent destination there being a respective user interface gesture created reference link such that subsequent modification of the test script content at the source is automatically made at each of the subsequent destinations without additional user input being performed, such that testing of a software design is modularized.

2. A method according to claim 1, wherein the received user interface gesture includes a copy/paste gesture effectively copying and placing the reference link between the destination and the source of the selected test script content.

3. A method according to claim 1, wherein the received user interface gesture includes a drag/drop gesture effectively draggingly moving and placing the reference link between the destination and the source of the selected test script content.

4. A method according to claim 1, wherein the using the computer device to create a reference link comprises:
   using a globally unique identifier to identify each test step of a test document; and
   using the globally unique identifier as a pointer from the destination to the source of the selected test script content.

5. A method according to claim 1, further comprising:
   using the computer device to render the selected test script content to the user as if the selected test script content was in-line at the destination.

6. A method according to claim 1, wherein the source and plurality of sources include two more of a current test document, an alternate test document, a project of tests, and a list of favorites.

7. A method according to claim 1, further comprising:
   using the computer device to cause a user interface to be displayed, the user interface comprising an outline sub-window, an editor sub-window, and a favorites sub-window;
   wherein at least the outline sub-window and the editor sub-window display a representation of the selected test script content.

8. A method according to claim 1, further comprising:
   using the computer device to cause a user interface to display an outline sub-window allowing alternate expanded and contracted representations of the selected test script content.

9. A method according to claim 1, further comprising:
   using the computer device to cause a user interface to display a favorites sub-window allowing user-selected test script content to persist in a linkable fashion between openings of different test documents.

10. A method according to claim 1, further comprising:
    using the computer device to cause a user interface to display a properties sub-window allowing user prescription of fields for input during execution of the selected test script content.

11. A method according to claim 1, further comprising:
    using the computer device to cause a user interface to display an outline sub-window for the selected test script content, allowing user creation of one or more of: test steps, verification points, test cases, or folders.

12. A system for modularizing testing of a software product, the system comprising:
    interface means of a computer device for receiving, as user input, a user interface gesture indicating: (a) a source of a test script content among a plurality of sources and (b) a destination, the test script content being selected from the source; and
    link means of the computer device responsive to the received user interface gesture and creating a reference link at the destination linking to the selected test script content at the source, the reference link effectively linking modification of the test script content at the destination to modification of the test script content at the source, such that subsequent modification of the test script content at the source is automatically made at the destination and at each destination linked to the source by a respective user interface gesture created link, without additional user input being performed;
    the interface means permitting re-use of the test script content by user selection of the test script content for at least one subsequent destination, for each subsequent destination there being a respective user interface gesture created reference link such that subsequent modification of the test script content at the source is automatically made at each of the subsequent destinations without additional user input being performed, such that testing of a software design is modularized.

13. A system according to claim 12, wherein the received user interface gesture includes a copy/paste gesture effectively copying and placing the reference link between the destination and the source of the test script content.

14. A system according to claim 12, wherein the received user interface gesture includes a drag/drop gesture effectively moving and placing the reference link between the destination and the source of the selected test script content.

15. A system according to claim 12, wherein the link means of the computer device comprises a globally unique identifier used as a pointer from the destination to the source of the selected test script content.

16. A system according to claim 12, wherein the interface means of the computer device comprises means for rendering the selected test script content to the user as if the selected test script content was in-line at the destination.

17. A system according to claim 12, wherein the interface means of the computer device comprises an outline sub-window, an editor sub-window, and a favorites sub-window; wherein at least the outline sub-window and the editor sub-window display a representation of the selected test script content.

18. A system according to claim 12, wherein the interface means of the computer device comprises an outline sub-window allowing alternate expanded and contracted representations of the selected test script content.

19. A system according to claim 12, wherein the interface means of the computer device comprises a favorites sub-window allowing user-selected test script content to persist in a linkable fashion between openings of different test documents.

20. A system according to claim 12, wherein the interface means of the computer device comprises a properties sub-window allowing user prescription of fields for input during execution of the selected test script content.

21. A system according to claim 12, wherein the interface means of the computer device comprises an outline sub-window for the selected test script content, allowing user creation of one or more of: test steps, verification points, test cases, or folders.

22. A software test apparatus of a computer device, the software test apparatus comprising:

a user interface of the computer device enabling (i) user selection of test script content, the test script content being at a source among a plurality of sources and (ii) through a user interface gesture, indication of the source and a destination of the selected test script content; and a reference link created by the computer device in response to the user interface gesture, the reference link being at the destination and linking to the selected test script content at the source, the reference link effectively linking modification of the selected test script content at the destination to modification of the test script content at the source such that subsequent modification of the test script content at the source is automatically made at the destination and at each destination linked to the source by a respective user interface gesture created reference link, without additional user input being performed;

the user interface of the computer device enabling re-use of test script content by user selection of the test script content for at least one subsequent destination, for each subsequent destination there being a respective user interface gesture created reference link of the computer device such that subsequent modification of the test script content at the source is automatically made at each of the subsequent destinations without additional user input being performed, such that testing of a software design is modularized.

* * * * *